(12) United States Patent
Ship et al.

(10) Patent No.: US 11,526,662 B2
(45) Date of Patent: Dec. 13, 2022

(54) SYSTEM FOR COLLABORATION ON THE DRAFTING OF A SHARED DIGITAL CONTRACT

(71) Applicant: Creative Intell, Inc., New York, NY (US)

(72) Inventors: Steven Ship, New York, NY (US); David Fritz, New York, NY (US)

(73) Assignee: Creative Intell, Inc., New York, NY (US)

( * ) Notice: Subject to any disclaimer, the term of this patent is extended or adjusted under 35 U.S.C. 154(b) by 0 days.

(21) Appl. No.: 17/510,335

(22) Filed: Oct. 25, 2021

(65) Prior Publication Data
US 2022/0229978 A1    Jul. 21, 2022

Related U.S. Application Data

(60) Provisional application No. 63/138,130, filed on Jan. 15, 2021.

(51) Int. Cl.
*G06F 3/00* (2006.01)
*G06F 40/197* (2020.01)
(Continued)

(52) U.S. Cl.
CPC .......... *G06F 40/197* (2020.01); *G06F 40/186* (2020.01); *G06F 40/40* (2020.01); *H04L 51/02* (2013.01); *H04L 51/046* (2013.01)

(58) Field of Classification Search
CPC ...... G06F 40/197; G06F 40/40; G06F 40/186; H04L 51/02; H04L 51/046
(Continued)

(56) References Cited

U.S. PATENT DOCUMENTS

| 10,607,298 B1 | 3/2020 | Hanekamp et al. |
| 2002/0129056 A1* | 9/2002 | Conant .................. G06Q 30/06 715/255 |

(Continued)

FOREIGN PATENT DOCUMENTS

| WO | WO 2015/077897 | 6/2015 |
| WO | WO 2017/083346 | 5/2017 |

(Continued)

OTHER PUBLICATIONS

U.S. Appl. No. 17/510,312, Steven Ship, Method of Guided Contract Drafting Using an Interactive Chatbot and Virtual Assistant, filed Oct. 25, 2021.

(Continued)

*Primary Examiner* — Manglesh M Patel
(74) *Attorney, Agent, or Firm* — Polsinelli LLP (57) ABSTRACT

The system and method for providing clause-based tailored editing in a collaborative digital contract drafting system. The collaborative digital contract drafting system allows multiple users from different parties to collaborate on the digital drafting, editing, and virtual negotiation of a digital contract. The system allows users to collaborate in real time during the drafting process and provides version control of the digital contract that is siloed between clauses and stored and tracked separately in a tracking database. Siloing the version control between clauses allows toggling between different versions of different clauses independent of one another.

20 Claims, 6 Drawing Sheets

(51) Int. Cl.
*G06F 40/186* (2020.01)
*H04L 51/046* (2022.01)
*H04L 51/02* (2022.01)
*G06F 40/40* (2020.01)

(58) Field of Classification Search
USPC .................................................. 715/751, 200
See application file for complete search history.

(56) References Cited

U.S. PATENT DOCUMENTS

| | | | |
|---|---|---|---|
| 2007/0250337 A1* | 10/2007 | Karamchedu | G06Q 10/10 705/348 |
| 2011/0296191 A1 | 12/2011 | Mouille | |
| 2014/0047330 A1* | 2/2014 | Yan | G06Q 10/101 715/273 |
| 2014/0123057 A1 | 5/2014 | Eigner et al. | |
| 2014/0149374 A1 | 5/2014 | Duran et al. | |
| 2014/0164255 A1 | 6/2014 | Daly et al. | |
| 2016/0012556 A1 | 1/2016 | Moore et al. | |
| 2017/0364374 A1 | 12/2017 | Maiden | |
| 2019/0215283 A1 | 7/2019 | Nahum et al. | |
| 2019/0354933 A1 | 11/2019 | Joanni et al. | |
| 2019/0377779 A1 | 12/2019 | Gelosi | |
| 2020/0184584 A1* | 6/2020 | Farivar | G06N 7/005 |
| 2020/0311688 A1 | 10/2020 | Lipman et al. | |
| 2020/0364813 A1 | 11/2020 | Turgman et al. | |
| 2020/0394734 A1 | 12/2020 | Moriarty et al. | |
| 2021/0027286 A1 | 1/2021 | Strashnoy | |
| 2021/0201013 A1 | 7/2021 | Makhija et al. | |
| 2021/0209708 A1 | 7/2021 | Admon | |
| 2021/0224937 A1 | 7/2021 | Luna et al. | |
| 2021/0398136 A1 | 12/2021 | Cebertowicz et al. | |
| 2022/0036424 A1 | 2/2022 | Almeida et al. | |
| 2022/0229860 A1 | 7/2022 | Ship | |

FOREIGN PATENT DOCUMENTS

| | | |
|---|---|---|
| WO | WO 2022/154845 | 7/2022 |
| WO | WO 2022/1544846 | 7/2022 |

OTHER PUBLICATIONS

PCT/US21/56521, Method of Guided Contract Drafting Using an Interactive Chatbot and Virtual Assistant, Oct. 25, 2021.
PCT/US21/56522, System for Collaboration on the Drafting of a Shared Digital Contract, Oct. 25, 2021.
Matteson, Scott; "10 ways Alexa can help you get work done", publisher: TechRepublic, pp. 1-10, published: Sep. 15, 2017 (Year: 2017).
U.S. Appl. No. 17/510,312 Office Action dated Apr. 12, 2022.
Betts et al., "The Dawn of Fully Automated Contract Drafting: Machine Learning Breathes New Life Into a Decades-Old Promise", 5 Duke Law & Technology Review 216-233 (2017). Retrieved Dec. 20, 2021. Retrieved from <URL: https://scholarship.law.duke.edu/dltr/vol15/iss1/11/>.
Liddicoat et al. "Beyond the hype AI and the law: an update", Future of Law, 2019. Retrieved on Dec. 20, 2021. Retrieved from <URL: http://www.cs.otago.ac.nz/research/ai/AI-Law/Beyondthehype.pdf>>.
PCT Application No. PCT/US2021/056521 International Search Report and Written Opinion dated Jan. 24, 2022.
PCT Application No. PCT/US2021/056522 International Search Report and Written Opinion dated Jan. 26, 2022.
U.S. Appl. No. 17/510,312 Final Office Action dated Jul. 28, 2022.

* cited by examiner

SYSTEM FOR COLLABORATION ON THE DRAFTING OF A SHARED DIGITAL CONTRACT

CROSS-REFERENCE TO RELATED APPLICATIONS

This application claims the benefit of, and priority to, U.S. Provisional Patent Application No. 63/138,130, filed on Jan. 15, 2021, entitled "System for Collaboration on the Drafting of a Contract", the contents of which are incorporated herein by reference in their entirety.

FIELD OF THE DISCLOSURE

The present disclosure is generally related to a collaborative digital contract drafting and negotiation process. More specifically the present disclosure is related to allowing users to collaboratively edit the digital contract and to communicate while developing collaborative digital contracts.

BACKGROUND

Collaborative digital contracts may be between at least two parties and in many cases more than two. With more than one party involved, it is often hard to get all parties to collaborate to make edits or review the digital contracts. Furthermore, when multiple people are trying to edit a similar digital contract there are often multiple versions of the digital contract circulating.

Furthermore, when users edit a digital contract, a "redlined" version that shows the edits users have made may be provided if the user turned "track changes" on and send the draft with the "track changes". Therefore, it would be difficult or not possible to revert to edits three versions prior given "track change" typically do not take into consideration the versions associated with each change on a macro level. Further, manually storing multiple versions can take significant memory when dealing with multiple digital contracts and it can become a daunting task to manage all the versions.

Current digital contract drafting and negotiation systems tend to be limited in their ability to provide a collaborative digital work environment where multiple users can review and edit a document in real time. Current digital contract drafting and negotiation systems also stop at the drafting process and digital contracts then need to be manually edited by other parties. The current system would provide a collaborative digital contract drafting and negotiation process that would suggest other parties that should be involved and allow them to interact and negotiate throughout the entire process through a common platform.

DETAILED DESCRIPTION

The present disclosure is generally related to a collaborative digital contract drafting and negotiation process. More specifically the present disclosure is related to allowing users to collaboratively edit a digital contract and to communicate while developing digital contracts. Furthermore, the edits and revisions by each user in the collaborative digital contract are tracked and stored so that users can view all changes.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
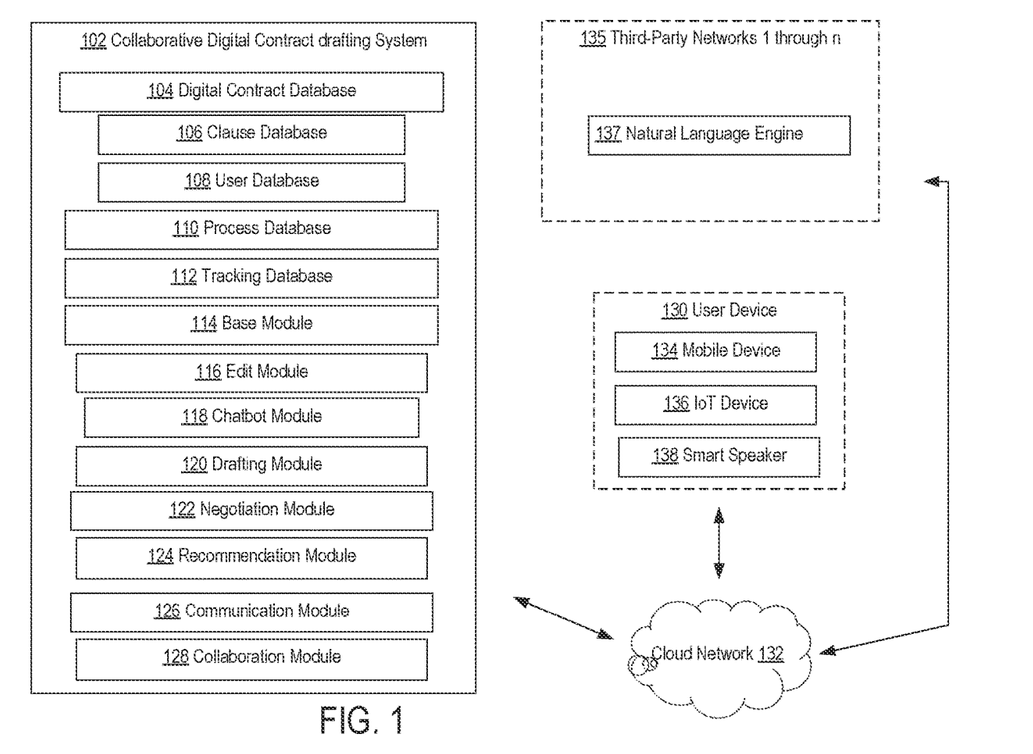
FIG. 1 illustrates an example collaborative digital contract drafting system, according to an embodiment.

FIG. 1 illustrates an example collaborative digital contract drafting system environment 100. The collaborative digital contract drafting system environment 100 may include a collaborative digital contract drafting system 102. A collaborative digital contract drafting process may allow a user to develop, negotiate, and collaborate on digital contracts by leveraging a virtual assistant that which provides a pleasant and natural medium for facilitating the digitized document drafting process. The collaborative digital contract drafting system 102 may allow parties to easily collaborate on the digital contract drafting and negotiation as it is all performed on a single platform and does not require emailing versions of the digital contract to all parties every time a change is made.

A virtual assistant or chatbot is a computer program designed to simulate conversation with a human user, especially over the internet. The chatbot may help a user through the process by asking questions to help fill in the digital contract and select the right content or clause. The chatbot can also provide education to the user about different sections or components of a digital contract. Furthermore, the chatbot will help ensure that all parties are contacted and involved especially at the negotiation phase of the digital contract.

The collaborative digital contract drafting system 102 may include a digital contract database 104 that stores templates of digital contracts for a specific industry. The templates that are stored in the digital contract database 104 may be standard digital contracts that are often used in an industry or may be custom templates created and stored by a user. For example, in many industries there is often a standard format for digital contracts that have been adopted and used across the industry. Furthermore, the language of the digital contracts is often very similar. In some instances, users may have a custom digital contract that they might use, in this case they would save and store their custom digital contracts.

When a digital contract is stored in the digital contract database 104, different clauses of the digital contract may be marked and identified, to allow easy identification of each clauses and replacement of clauses during the digital contract drafting process. For example, a digital contract may have the following clauses identified: preamble, definitions, action section, reps & warranties, covenant and rights, conditions to obligations, end game provisions & remedies, general provisions, and signatures. Additionally, in some industries there are many different types of digital contracts. The digital contracts can further be categorized and organized within the database based on their use case.

The collaborative digital contract drafting system 102 may include a clause database 106 that stores all possible clauses or language for different clauses of a digital contract. This clause database 106 may be used to customize a standard digital contract with language that better suits the user's needs. The clause database 106 may contain standard clauses often used in an industry but would also store custom or alternative clauses for different purposes or use cases.

The collaborative digital contract drafting system 102 may include a user database 108 that stores user data including basic contact information, general profile information, and current and past activity. Current and past activity may include current and past digital contracts the user has developed or executed. In one embodiment, current and past activity can be used to facilitate future digital contracts. By leveraging previous user digital contracts, the collaborative digital contract drafting system 102 can autofill certain common fields such as certain parties to be involved and automatically use previous clauses the user has used when developing and customizing a digital contract. Autofill is a software feature that automatically enters previously stored information, such as a user's name or address, into a data field. This would greatly improve the accuracy and speed of the digital contract drafting process.

Furthermore, the user data can be leveraged by a recommendation module 124 for all users to recommend specific types of digital contracts, clauses, or even recommend other parties that should be involved. It can even recommend other digital contracts the user might need. Often, a user may enter into one digital contract, for example, a digital contract for producing a music video with a producer. The system can then recommend that the user also develop a digital contract for other required parties that need to be involved, such as a director, editor, etc. The user database 108 also stores a type of user. The type of user depends on the role the user would play within a digital contract process. Some examples of different user types might include an administrator, an attorney, or a specific occupation. In different industries, different occupations may determine the role in a digital contract drafting and negotiation process.

For example, the process database 110 may have a step-by-step process for developing a digital contract with each step in the process listed out. The first step might be asking for the user's name and address. Associated with this step would be questions the chatbot could use to communicate with the user. Furthermore, process database 110 may allow for dynamic and customizable workflows that can adapt to various scenarios or other applications. The tracking database 112 may store digital contract changes for each digital contract from each user. By storing all the different versions, a user could revert or see all the different changes to digital contract. For example, if a first user makes edits to a digital contract and then a second user edits the digital contract, each edit is stored in a file within the tracking database 112 like an audit trail.

Furthermore, the collaborative digital contract drafting system 102 can further extract data from digital contracts created on the collaborative digital contract drafting system 102 to create an intellectual property catalog and tracking system, allowing the user to create reports and API or XML, them to other systems. These reports may include Chain of Title and Label copy reports. The data from the system can be augmented with manual data entry and third-party databases. It aids in registration of trademarks and copyrights. Furthermore, these forms can be created on the system and can store registrations. Registrations and digital contracts created outside of the platform can be uploaded to the platform for storage and linked to a catalog section database. The catalog database could be included in the user database 108 or the digital contract database 104. For example, in the case of a song, the collaborative digital contract drafting system 102 may store, track, and display the metadata surrounding the writing, creation, publishing, recording, masters, and releases of all songs and their recordings.

The collaborative digital contract drafting system 102 may include a base module 114 that is initiated when a user initiates the collaborative digital contract drafting system 102. The base module 114 may control and initiate all the other modules or processes within the collaborative digital contract drafting system 102. For example, the base module 114 may initiate the recommendation module 124 as soon as the collaborative digital contract drafting system 102 was activated to start analyzing digital contract data to provide recommendations to a user on certain actions or other parties that they might want to involve. The base module 114 would then monitor user inputs and determine which modules to initiate next. For example, if a user has finished the drafting process, the user may initiate the collaboration module 128 which will reach out other parties to review the digital contract, which may further initiate an edit module 116, which would begin the collaborative editing process.

The edit module 116 may be initiated by the base module 114 when a user selects an option to make edits to a digital contract. The edit module 116 may allow users to select a portion of a digital contract to be edited. The user can then choose to change specific text within the document or select and change larger sections of the document, such as replacing an entire clause within the document.

The editing module may cycle through the clauses available in a current draft digital contract and further suggest other clauses that are not yet included. Available clauses include but are not limited to a preamble, recitals, services, ownership, exploitation rights, credit, representation and warranties, remedies, and various so-called "boilerplate" clauses. The clauses may be suggested in an order based on path and text-based logic via questions by the chatbot module 118. The path may be determined based on a database of stored contract data with clause paths that may provide a next recommended clause.

Changes made by the user may then added to the tracking database 112. The user can also use the edit module 116 to review which edits or revisions have been made by the user or other users. For example, while in edit mode in the edit module 116, the user would see (such as in a window that is next to the digital contract that is synced) an audit trail of edits that users made to the document. Furthermore, users can select if they want to see the edits or revisions or if they want to turn them off. Additionally, by clicking on a specific edit or revision in the window of edits, the user could see or filter on which edits each specific user made.

The chatbot module 118 may utilize a natural language engine 137 to provide a user with a natural and fluid way to communicate and collaborate with the collaborative digital contract drafting system 102 and other users. Natural Language Processing (NLP) is a form of artificial intelligence (AI) that gives computers the ability to read, understand, and interpret human language. It helps computers measure sentiment and determine which parts of human language are important. The chatbot module 118 can also be used to control the collaborative digital contract drafting system 102 by using commands. The chatbot module 118 may leverage the other modules and databases in the collaborative digital contract drafting system 102 to provide a natural conversational flow that guides a user through the digital contract process.

The natural language engine 137 may be housed within the collaborative digital contract drafting system 102 or the chatbot module 118 could leverage a third-party natural language engine 137 on one or more third party networks 135. Natural language engines 137 are well known in the industry and are easy to connect to through APIs. The drafting module 120 may be used to help guide the digital contract process by polling the process database 110, determining the different sections in the digital contract and inputting data from the user into the digital contract sections or fields. For example, if a user is starting a new digital contract, the drafting module 120 would be initiated, the drafting module 120 then starts to receive inputs from the user. It also receives the current step or process, so it knows where to input the data. The drafting module 120 can also be used to determine if there are any sections or fields of the digital contract that are missing or not filled in.

The negotiation module 122 may control the negotiation process. Similar to the drafting module 120, the negotiation module 122 interacts with the process database 110 to understand the steps of negotiation and communicates those to the user. The negotiation module 122 may be initiated when the user has completed the drafting of the digital contract. The negotiation module 122 may help coordinate all parties and send copies of the digital contract to each user. Furthermore, the negotiation module 122 and process would not be limited to just a review process, but could be broken in to multiple steps such as a "handoff" step and a "review" step. Furthermore, these steps may repeat depending on the number of times parties make changes or edits to the digital contract. Once the digital contract has been accepted by all parties and no more edits are required, the system allows users to sign the document electronically, i.e., e-signature or digital signature. This allows users and parties to easily execute a digital contract within the system.

The recommendation module 124 may be used to recommend specific pieces of information throughout the digital contract drafting as well as recommend potential other users or parties that the user might want to involve in the digital contract process. For example, the recommendation module 124 may suggest specific clauses based on the clauses that someone else has used. Furthermore, the recommendation module 124 might suggest additional or other parties that may have been forgotten or other associated digital contracts that might need to be developed and might have been overlooked. Furthermore, data acquired from analyzing digital contract data by the recommendation module 124 can be used for broader analytics and reports, such as the ability to summarize the data from multiple agreements and compare, the ability to review the usage of any terms or clauses used in digital contracts, and the ability to track the status of all digital contracts in the collaborative digital contract drafting system 102.

The collaborative digital contract drafting system 102 may include a communication module 126 that is used to coordinate communications between users both in real time and when users are not online. For example, while editing a digital contract, a first user may want to ask a second user a question. By activating the communication module 126 from the base module 114, the first user can open a chat window and send direct message to a second user or communicate to all parties associated with the digital contract. If the second user is online, they will receive the message in real time and can respond in real time. If the second user is not logged into the system, then an alert can be sent to the second user. The alert may be an email letting the user know they have a communication or message on the digital contract system. The message can be stored in memory or, in another embodiment, all messages can be stored in the tracking database 112 as part of the audit trail.

The collaboration module 128 may coordinate all parties involved in the digital contract. Once the digital contract is completed during the drafting phases, all parties involved are contacted through the system. If a party of the digital contract is not in the collaborative digital contract drafting system 102, they are sent a link to log into the collaborative digital contract drafting system 102. If the party member does not want to create an account, they can still participate via a guest user account. The user device 130, including any type of tablet or computer, a mobile device 134, such as smartphone, an Internet of Things (IoT) device 136, and/or a smart speaker 138 may need the capability for the user to be able to interact with the chatbot and see the digital contract or interact with the digital contract on a screen or display in certain parts of the collaborative digital contract drafting process.

The cloud network 132 may be a type of IT infrastructure in which some or all of an organization's network capabilities and resources are hosted in a public or private cloud platform, managed in-house or by a service provider, and available on demand. The cloud network 132 may also be referred to as a distributed network. Third-party software can be accessed as a server through APIs or other means through the cloud network 132. One or more third party networks 135 may be connected to the cloud network 132 allowing access to third party resources and software, such as a natural language engine 137 or artificial intelligence. The natural language engine 137 or Natural Language Processing (NLP) is a form of artificial intelligence (AI) that gives computers the ability to read, understand, and interpret human language, and further help computers measure sentiment and determine which parts of human language are important. For computers, this is an extremely difficult thing to do because of the large amount of unstructured data, the lack of formal rules, and the absence of real-world context or intent. There are already many natural language engines in the market and are well known in the art.

Functioning of the user database 108 will be explained with reference to Table 1 below.

TABLE 1

User Database

| User ID | Name | Username | Email | Address | User Type | Digital contract Data |
|---|---|---|---|---|---|---|
| 0001 | John Smith | Jsmith | smith@email.com | 8 Main St., Lincoln, NC | Digital contractee | Digital contractJS001.dat Digital contractJS002.dat Digital contractJS003.dat |
| 0002 | Bob Johnson | Bjohnson | Bjohnson2@email.com | 33 Swift St., Charlotte, NH | Attorney | Digital contractBJ001.dat |
| 0003 | Stacey Beckham | Sbeckham | sbeckham@email.com | 4 East St., Albany, NY | Digital contractor | Digital contractJS001.dat Digital contractJS002.dat Digital contractJS003.dat |
| 0004 | Christina Thomas | Cthomas | cthomas@email.com | 6 West St., Potsdam NY | Digital contractor | Digital contractCT001.dat |

The user database 108 may contain all user data including basic contact information, general profile information, and current and past activity. Current and past activity may include current and past digital contracts the user has developed or has entered. In one embodiment, current and past activity can be used to facilitate future digital contracts. By leveraging previous user digital contracts, the collaborative digital contract drafting system 102 can autofill certain common fields such as certain parties to be involved and automatically use previous clauses the user has used when developing and customizing a digital contract. This would greatly improve the accuracy and speed of the digital contract drafting process. User profile information may be stored in a table. A user's current and past activity is stored in a table but also linked to the files that are associated with each activity. The files would contain digital contract data that is either in progress or completed.

Functioning of the tracking database 112 will be explained with reference to Table 2 below.

TABLE 1

User Database

| Digital contract Data | Timestamp | Username | Digital contract Data |
|---|---|---|---|
| Digital contractJS001.dat | Nov. 17, 2019 1:00 PM | Jsmith | Digital contractEditsJS001.dat |
| | Nov. 17, 2019 2:00 PM | Bjohnson | Digital contractEditsJS002.dat |
| | Nov. 17, 2019 5:00 PM | Jsmith | Digital contractEditsJS003.dat |
| | Nov. 17, 2019 7:00 PM | Sbeckham | Digital contractEditsJS004.dat |
| | Nov. 18, 2019 4:00 PM | Jsmith | Digital contractEditsJS005.dat |
| Digital contractCT001.dat | Nov. 17, 2019 1:00 PM | Cthomas | Digital contractEditsCT001.dat |
| | Nov. 17, 2019 2:00 PM | Msimpson | Digital contractEditsCT002.dat |
| | Nov. 17, 2019 5:00 PM | Cthomas | Digital contractEditsCT003.dat |

The tracking database 112 may contains data for all edits and revisions done on a digital contract. The edits and revisions are stored in data files for each digital contract. Each digital contract may have multiple files for storing edits and revisions. The files would include the changes made, the user who made the changes, and a time stamp of when the user made the change. The separation of each change in a data file allows each change to be tracked and then recalled as needed. It also creates a comprehensive audit trail, at database 300.

Figure 2:
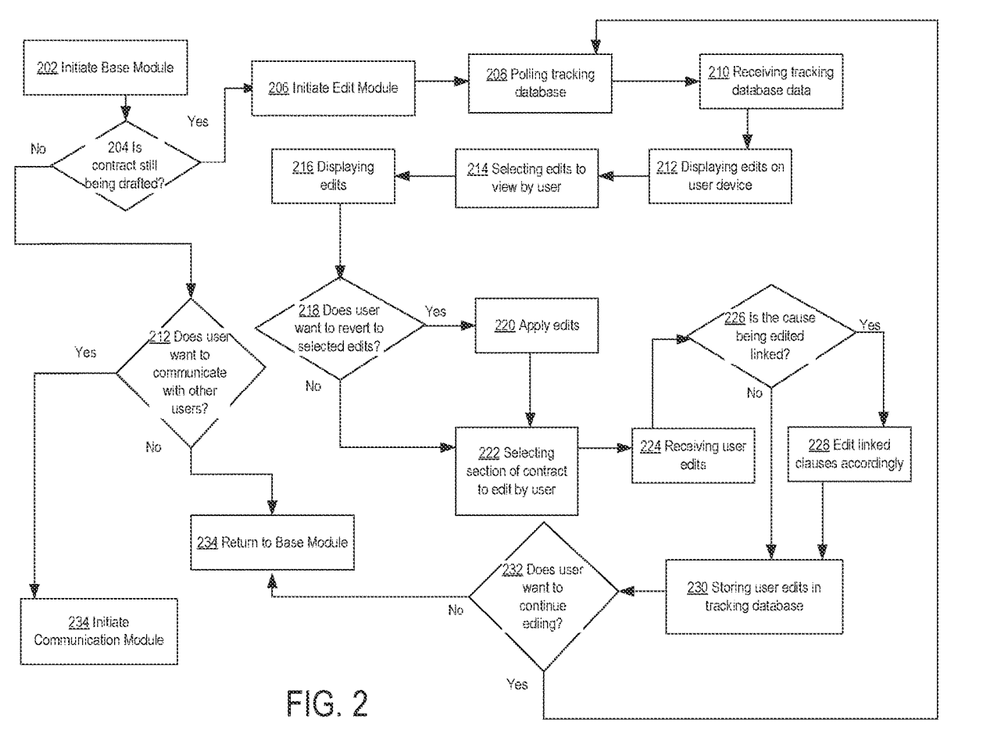
FIG. 2 illustrates an example workflow performed by a collaboration between a base module and an edit module, according to an embodiment.

FIG. 2 illustrates an example workflow 200 performed by the base module 114, in coordination with the edit module 116, according to an embodiment The example workflow 200 may begin with the user initiating the base module 114 from their user device 130, at step 202. The base module 114 may then determine if the digital contract is still being developed, such as by determining if the drafting module 120 is still active, at step 204. If the digital contract is still being developed, the base module 114 may initiate the edit module 116, in step 206. If the digital contract is no longer in the drafting stage, the chatbot module 118 may inquire whether the user wants to communicate with other users, in step 207. If the user does want to communicate with others, the base module 114 may initiate the communication module 126, in step 209.

The edit module 116 may allow users to make edits to the digital contract and view all edits in line with the digital contract. The edits may be displayed to a user on the user device 130. Once the edit module 116 has been initiated, the tracking database 112 may be polled to retrieve any edit or revision data that has been stored for a specific digital contract that the user is looking to edit, at step 208. If there is any tracking data in the tracking database 112, then the data will be received at the edit module 116, at step 210. Once the tracking data is received, if there is any, it is then displayed to at the user device 130, at step 212.

There are many ways edits or revisions to a digital contract can be displayed. The user may select specific edits to view or review, at step 214. Because several users may be making edits to the digital contract, the user can turn on or off or select specific edits for specific users to review. In other words, the edit module 116 may track and store each individual edit for each of several users and allows each user to toggle view of each of the changes independently, such as by selecting and toggling each edit on or off. If a user selects specific edits, those edits are then displayed, at step 216. For example, as mentioned in one of the embodiments above, there may be a secondary window associated with the document that lists all the edits or revisions. The user can use this secondary window to select specific edits or revisions to view. In some cases, the user might want to turn specific revision on or off to see the difference in the edits or revisions. In some cases, a side-by-side comparison viewing option may be available, wherein users can select or filter any version and any date and create side-by-side comparison view including redlines.

In some situations, a user might want to revert to an earlier version of a document during the editing process, at step 218. But because digital contracts are often segregated into specific sections or clauses, some portions of the digital contract may be fine with the current edit, while another section or clause may need to be reverted back to its original state or to an earlier version of edits. The user can then select those earlier edits for a specific section and revert to the older edits. If the user wants to revert a section back to an older version, then the edits are applied to the document, at step 220. Alternatively, a user can forego reverting to any older edits and make their own edits. The user may then select what section of the digital contract or document that they want to make the edits in and make edits in the document, at step 222. Edits from the user are then received, at step 224. The edit module 116 may determine whether the edits are in a clause that is linked to other clauses, in step 226. If the edits are linked, the edit module 116 may edit linked causes accordingly based on the edit, in step 228, and possibly notify the user if there is further input needed at the linked clauses. Alternatively, or in addition to, the user may be notified whether certain edits cause an error or issue in the digital contract, such deleting a definition of a term that later recited in the digital contract.

The received edits may be anything from changing text, deleting text, replacing clauses, or other types of edits a user might make to a digital contract or document. The user's edits may then be stored in the tracking database 112 in a data file along with the user's name and a time stamp, at step 230. This is to allow other users to see the edits or revisions that the user made. If the user is done editing then, the module will end. If not, the edit module 116 will return to step 302, at step 232. Once the user is done editing, the edit module will return to base module 114, at step 234.

Figure 3A:
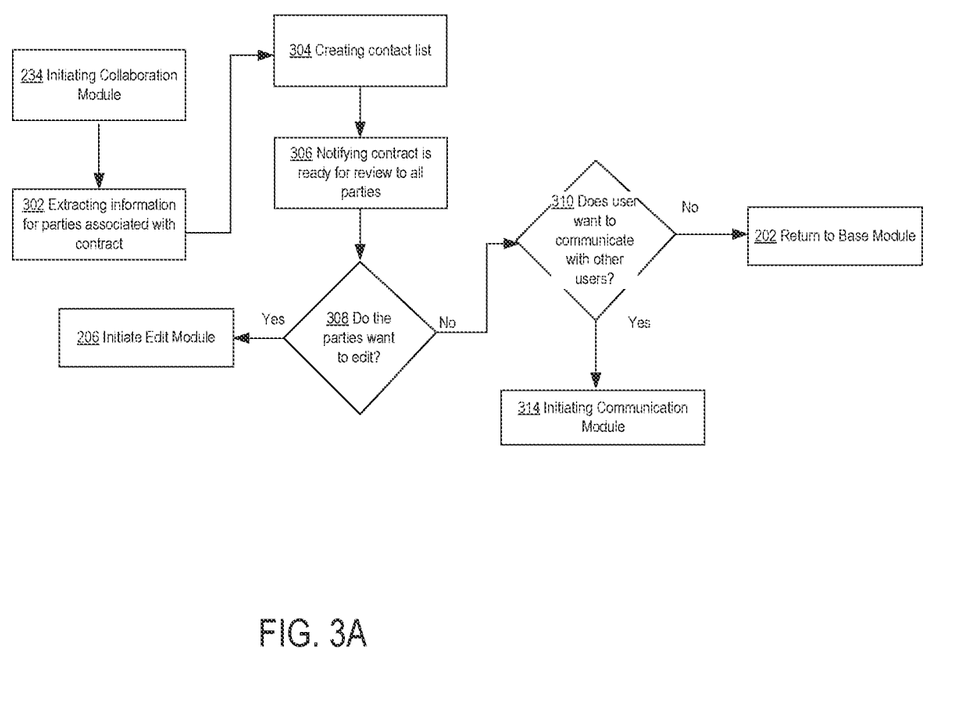
FIG. 3A illustrates an example workflow performed by a collaboration module, according to an embodiment.

FIG. 3A illustrates an example workflow 300A performed by the collaboration module 128, according to an embodiment. The example workflow 300A may begin with base module 114 initiating the collaboration module 128, in step 234, which may be a continuation of the example workflow 200 of FIG. 2. The collaboration module 128 may extract relevant parties associated with the digital contract in step 302. For example, the collaboration module 128 may poll the current digital contract data in the user database 108. Since user digital contract data is stored in the user database, the parties that are associated with each digital contract would also be stored in the digital contract data. Because digital contracts are structured, they will contain most of the information for parties involved. Each of the parties associated with the digital contract has contact information, which may then be extracted from the digital contract data.

The collaboration module may then create a contact list of the parties involved with the digital contract, in step 304. Then, the contact list may be communicate with to notify and the parties that the digital contract is ready for review, editing, or revisions and/or provide access to the digital contract. In one embodiment, the contact list may be stored in the user database with the digital contract data so that it can be accessed by the communication module 126. For example, all parties may receive an email with an encrypted link that provides each user with access to review and edit the digital contract. If a user has already registered in the system when they receive the link, they can simply access the digital contract by logging into the system. Associated parties that do not have an account can still access the system through a guest portal or may choose to create an account. The list of contacts for the particular digital contract is then stored with the digital contract in the user database 108 so it can be called up again when a user wants to send a new notification.

Once parties have been invited to view the digital contract, they may choose whether they want to collaboratively, or individually, edit the digital contract, in step 308. If any of the users wants to edit or review the digital contract, then the edit module 116 may be initiated, in step 206. Similarly to the steps in FIG. 2, the edit module 116 may track any edits or revisions as well as allow one or more users to select and see what edits or revisions have been done, and may further allow real-team collaboration whereby editing may be viewed in real-time.

During the editing process, a user may want to communicate to other parties associated with the digital contract. The collaboration module 128 and/or the base module 114 may determine whether the users want to communicate with each other, in step 310. It could be a user who is collaborating on the digital contract, an attorney, or all parties involved. If the user does not want to communicate, the base module 114 may move to step 312. If the user does want to communicate, the communication module 126 may be initiated, at step 314.

Figure 3B:
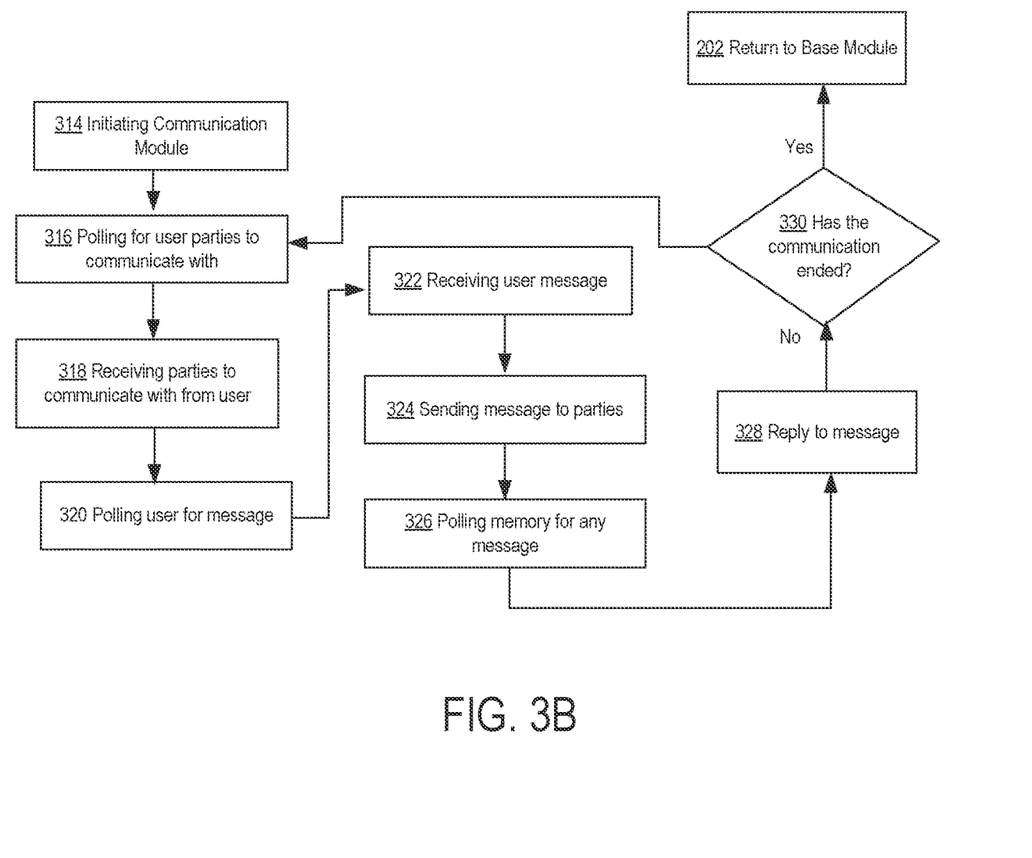
FIG. 3B illustrates an example workflow performed by a communication module, according to an embodiment.

FIG. 3B illustrates an example workflow 300B performed by the communication module 126, according to an embodiment. The example workflow 300B may begin with base module 114 initiating the collaboration module 128, in step 234, which may be a continuation of the example workflow 300A of FIG. 3A. The communication module 126 may control the communications between users associated with the digital contract. The communication module may let a user communicate with specific users or a specific group of users. The communication module 126 may poll the user device for an input on who they user would like to communicate with, at step 316. The user may see a list of potential other users associated with the current digital contract they are reviewing with whom they can communicate. This list of users may be developed by the collaboration module 128 which may run prior the communication module 126. The communication module 126 may then receive from the user's selection or input to whom they would like to send a message or communication, at step 318.

The user may select one other user to send a message to or select a group of users to send the message to. In another embodiment of the system, as part of the collaboration process, the user, instead of selecting other parties to message, could assign a task. In this embodiment, the task could be stored with the digital contract data or tracking data in the tracking database 112. The communication module 126 may then poll the user for a message that they want to send to the selected party member or members, at step 320. In another embodiment where the user sends a task to a party member or members, the communication module 126 may poll the user for the task they want to send. The user's message may then be received by the communication module 126, at step 322. The message received from the user may then sent to all party members that were selected, at step 324.

In the additional embodiment mentioned above, the task would be sent to the selected party member or members as well as stored either in the digital contract data or the tracking database 112. Furthermore, tasks can be sent or created for parties or individuals. The tasks can be automatically created based on actions of the user interacting with the system or chatbot or automatically created based on the digital contract and what needs to be completed. A user can also manually create a task and assign it. The communication module 126 can then poll the system memory for any new messages that the user may have received from other users, at step 326.

In another embodiment, the message data could be stored in a database or only offline messages could be stored in a database, such as the tracking database 112. This way, data can be tracked and would create a communications audit trail. Often, the communications or messages will be instant or real-time messages and not sent to an offline user, so storing those messages may not be beneficial. Instead, the messages would be stored in memory and removed after the user views them and after a certain period. If the user has a message from another user, they can then reply to that user or users, at step 328. The communication module 126 then checks to see if the user is still active. If the user is no longer active, it can end, at step 516. Otherwise, the communication module 126 returns step 316. Once the user is no longer active on the system, the communication module 126 ends, at step 330. If the user is no longer active, they are no longer messaging, so the module ends.

Figure 4:
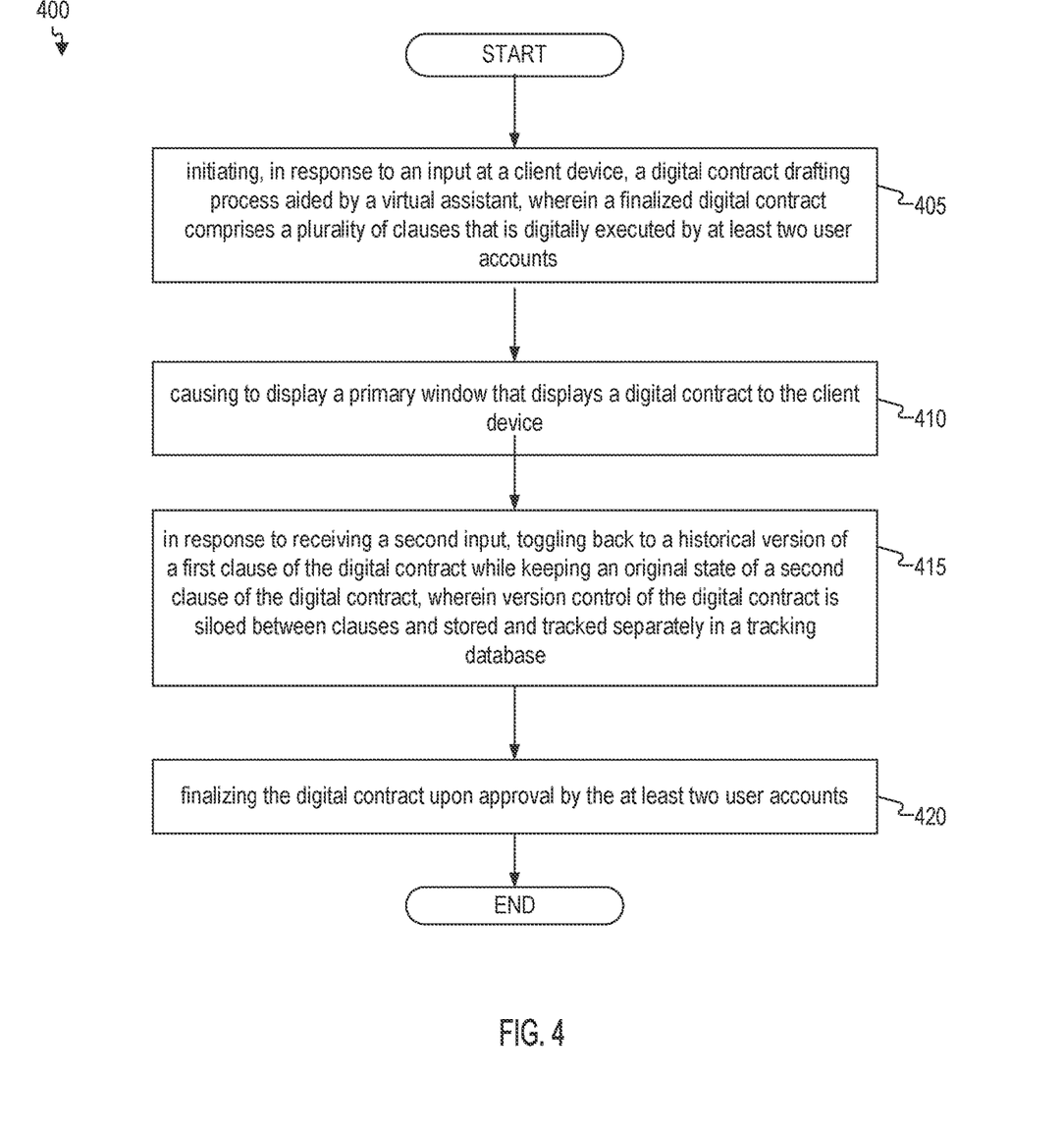
FIG. 4 illustrates an example method for providing clause-based tailored editing in a collaborative digital contract drafting system, according to an embodiment.

FIG. 4 illustrates an example method 400 for providing clause-based tailored editing in a collaborative digital contract drafting system. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some aspects of this disclosure, the method includes initiating, in response to an input at a client device, a digital contract drafting process aided by a virtual assistant at block 405. For example, the base module 114 illustrated in FIG. 1 may initiate, in response to an input at a client device, a digital contract drafting process aided by a virtual assistant. A finalized digital contract comprises a plurality of clauses that is digitally executed by at least two user accounts.

According to some aspects of this disclosure, the method includes causing to display a primary window that displays a digital contract to the client device at block 410. For example, the edit module 116 and/or the user device 130 illustrated in FIG. 1 may cause to display a primary window that displays a digital contract to the client device.

According to some aspects of this disclosure, the method includes in response to receiving a second input, toggling back to a historical version of a first clause of the digital contract while keeping an original state of a second clause of the digital contract at block 415. For example, the edit module 116, the tracking database 112, and/or the user device 130 illustrated in FIG. 1 may in response to receive a second input, toggle back to a historical version of a first clause of the digital contract while keep an original state of a second clause of the digital contract. Version control of the digital contract is siloed between clauses and stored and tracked separately in a tracking database.

According to some aspects of this disclosure, the method includes finalizing the digital contract upon approval by the at least two user accounts at block 420. For example, the drafting module 120 illustrated in FIG. 1 may finalize the digital contract upon approval by the at least two user accounts.

According to some aspects of this disclosure, the method includes causing to display a secondary window that displays one or more historical versions of each clause separately. For example, the edit module 116, the clause database 106, or the tracking database 112 illustrated in FIG. 1 may cause to display a secondary window that displays one or more historical versions of each clause separately. According to some aspects of this disclosure, the method includes receiving a selection of one historical version of the one or more historical versions that toggles the one historical version to be displayed in the digital contract in the primary window. For example, the edit module 116 or the tracking database 112 illustrated in FIG. 1 may receive a selection of one historical version of the one or more historical versions that toggles the one historical version to be displayed in the digital contract in the primary window.

According to some aspects of this disclosure, the method includes receiving a request to swap a third clause for a different clause. For example, the edit module 116 or the tracking database 112 illustrated in FIG. 1 may receive a request to swap a third clause for a different clause. The third clause is linked to a fourth clause in a series of linked clauses. According to some aspects of this disclosure, the method includes swapping the fourth clause to match the different clause or notifying that there is an error if there is no stored clause to swap with the fourth clause that matches the different clause at. For example, edit module 116, the clause database 106, or the tracking database 112 illustrated in FIG. 1 may swap the fourth clause to match the different clause or notify that there is an error if there is no stored clause to swap with the fourth clause that matches the different clause.

According to some aspects of this disclosure, the method includes receiving a new clause that is indicated to be swap with the fourth clause to match the different clause. For example, the edit module 116, the clause database 106, or the tracking database 112 illustrated in FIG. 1 may receive a new clause that is indicated to be swap with the fourth clause to match the different clause. According to some aspects of this disclosure, the method includes storing the new clause in the clause database 106 as a linked clause to the different clause. For example, the edit module 116 or the clause database 106 illustrated in FIG. 1 may store the new clause in the clause database as a linked clause to the different clause.

According to some aspects of this disclosure, the method includes receiving the request to swap via the virtual assistant. For example, the chatbot module 118 illustrated in FIG. 1 may receive the request to swap via the virtual assistant. According to some aspects of this disclosure, the method includes causing the virtual assistant to ask whether a user wants to swap other linked clauses. For example, the chatbot module 118 illustrated in FIG. 1 may cause the virtual assistant to ask whether a user wants to swap other linked clauses.

According to some aspects of this disclosure, the method includes receiving a third input that initiates a communication module. For example, the base module 114 illustrated in FIG. 1 may receive a third input that initiates a communication module. According to some aspects of this disclosure, the method includes receiving communication from a first user account of the at least two user accounts. For example, the communication module 126 illustrated in FIG. 1 may receive communication from a first user account of the at least two user accounts. According to some aspects of this disclosure, the method includes sending the communication to at least another user account of the at least two user accounts. For example, the communication module 126 illustrated in FIG. 1 may send the communication to at least another user account of the at least two user accounts. According to some aspects of this disclosure, the method includes storing the communication in associated with the digital contract in the tracking database. For example, the communication module 126 and/or the tracking database 112 illustrated in FIG. 1 may store the communication in associated with the digital contract in the tracking database.

According to some aspects of this disclosure, the method includes analyzing the digital contract for document data. For example, the recommendation module 124 illustrated in FIG. 1 may analyze the digital contract for document data. According to some aspects of this disclosure, the method includes utilizing the analyzed document data to provide a summarized report that summarizes data from multiple documents and provide review of usage of terms and clauses in the multiple documents. For example, the recommendation module illustrated in FIG. 1 may utilize the analyzed document data to provide a summarized report that summarizes data from multiple documents and provide review of usage of terms and clauses in the multiple documents.

Figure 5:
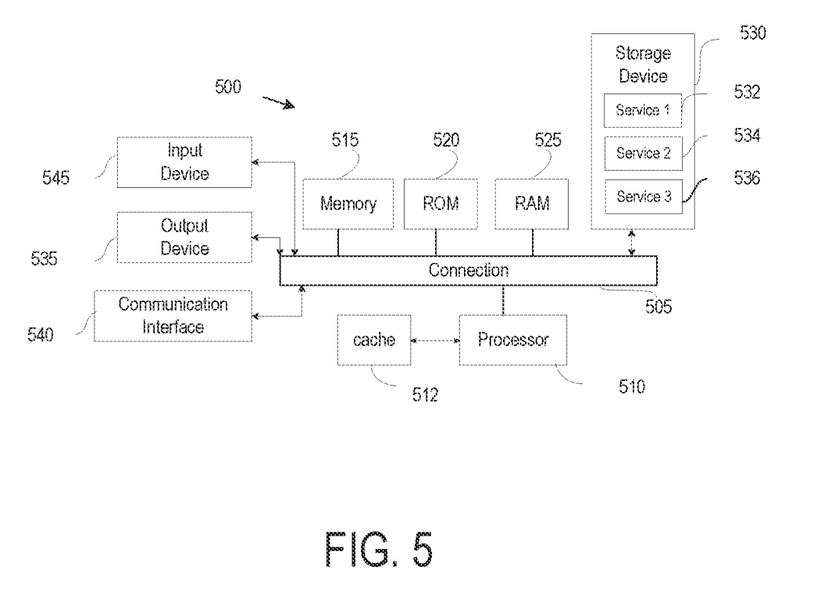
FIG. 5 illustrates an example computing system in accordance with an embodiment.

FIG. 5 shows an example of computing system 500, which can be for example any computing device making up the collaborative digital contract drafting system 102 or the user device 130, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method of providing clause-based tailored editing in a collaborative digital contract drafting system comprising:
    initiating, in response to an input at a client device, a digital contract drafting process aided by an interactive chatbot, wherein a finalized digital contract comprises a plurality of clauses that is digitally executed by at least two user accounts;
    causing to display a primary window that displays a digital contract to the client device;
    causing to display a secondary window that displays one or more historical versions of each clause separately;
    receiving a selection of one historical version of the one or more historical versions that toggles the one historical version to be displayed in the digital contract in the primary window;
    in response to receiving the selection, toggling back to a historical version of a first clause of the digital contract while keeping an original state of a second clause of the digital contract, wherein version control of the digital contract is siloed between clauses and stored and tracked separately in a tracking database; and
    finalizing the digital contract upon approval by the at least two user accounts.

2. The method of claim 1, further comprising:
    receiving a request to swap a third clause for a different clause, wherein the third clause is linked to a fourth clause in a series of linked clauses; and
    swapping the fourth clause to match the different clause or notifying that there is an error if there is no stored clause to swap with the fourth clause that matches the different clause.

3. The method of claim 2, further comprising:
    receiving a new clause that is indicated to be swap with the fourth clause to match the different clause; and
    storing the new clause in a clause database as a linked clause to the different clause.

4. The method of claim 2, further comprising:
    receiving the request to swap via the interactive chatbot; and
    causing the interactive chatbot to ask whether a user wants to swap other linked clauses.

5. The method of claim 1, further comprising:
    receiving a third input that initiates a communication module;
    receiving communication from a first user account of the at least two user accounts;
    sending the communication to at least another user account of the at least two user accounts; and
    storing the communication in associated with the digital contract in the tracking database.

6. The method of claim 1, further comprising:
    analyzing the digital contract for document data; and
    utilizing the analyzed document data to provide a summarized report that summarizes data from multiple documents and provide review of usage of terms and clauses in the multiple documents.

7. The method of claim 1, further comprising toggling back to a previous edit within a clause without changing the rest of the clause in response to receiving a selection of a historical change.

8. A non-transitory computer-readable storage medium comprising instructions, the instructions, when executed by a computing system, cause the computing system to:
    initiate, in response to an input at a client device, a digital contract drafting process aided by an interactive chatbot, wherein a finalized digital contract comprises a plurality of clauses that is digitally executed by at least two user accounts;
    cause to display a primary window that displays a digital contract to the client device;
    cause to display a secondary window that displays one or more historical versions of each clause separately;
    receive a selection of one historical version of the one or more historical versions that toggles the one historical version to be displayed in the digital contract in the primary window;
    in response to receiving the selection, toggle back to a historical version of a first clause of the digital contract while keeping an original state of a second clause of the digital contract, wherein version control of the digital contract is siloed between clauses and stored and tracked separately in a tracking database; and
    finalize the digital contract upon approval by the at least two user accounts.

9. The non-transitory computer-readable storage medium of claim 8, wherein the non-transitory computer-readable medium further comprises instructions that, when executed by the computing system, cause the computing system to:
    receive a request to swap a third clause for a different clause, wherein the third clause is linked to a fourth clause in a series of linked clauses; and
    swap the fourth clause to match the different clause or notify that there is an error if there is no stored clause to swap with the fourth clause that matches the different clause.

10. The non-transitory computer-readable storage medium of claim 9, wherein the non-transitory computer-readable medium further comprises instructions that, when executed by the computing system, cause the computing system to:
    receive a new clause that is indicated to be swap with the fourth clause to match the different clause; and store the new clause in a clause database as a linked clause to the different clause.

11. The non-transitory computer-readable storage medium of claim 9, wherein the non-transitory computer-readable medium further comprises instructions that, when executed by the computing system, cause the computing system to:
receive the request to swap via the interactive chatbot; and
cause the interactive chatbot to ask whether a user wants to swap other linked clauses.

12. The non-transitory computer-readable storage medium of claim 8, wherein the non-transitory computer-readable medium further comprises instructions that, when executed by the computing system, cause the computing system to:
receive a third input that initiates a communication module;
receive communication from a first user account of the at least two user accounts;
send the communication to at least another user account of the at least two user accounts; and
store the communication in associated with the digital contract in the tracking database.

13. The non-transitory computer-readable storage medium of claim 8, wherein the non-transitory computer-readable medium further comprises instructions that, when executed by the computing system, cause the computing system to:
analyze the digital contract for document data; and
utilize the analyzed document data to provide a summarized report that summarizes data from multiple documents and provide review of usage of terms and clauses in the multiple documents.

14. The non-transitory computer-readable storage medium of claim 8, wherein the non-transitory computer-readable medium further comprises instructions that, when executed by the computing system, cause the computing system to toggle back to a previous edit within a clause without changing the rest of the clause in response to receiving a selection of a historical change.

15. A system comprising:
a storage configured to store instructions;
one or more processors configured to execute the instructions and cause the one or more processors to:
initiate, in response to an input at a client device, a digital contract drafting process aided by an interactive chatbot, wherein a finalized digital contract comprises a plurality of clauses that is digitally executed by at least two user accounts;
cause to display a primary window that displays a digital contract to the client device;
cause to display a secondary window that displays one or more historical versions of each clause separately;
receive a selection of one historical version of the one or more historical versions that toggles the one historical version to be displayed in the digital contract in the primary window;
in response to the receiving the selection, toggle back to a historical version of a first clause of the digital contract while keeping an original state of a second clause of the digital contract, wherein version control of the digital contract is siloed between clauses and stored and tracked separately in a tracking database; and
finalize the digital contract upon approval by the at least two user accounts.

16. The system of claim 15, wherein the one or more processors are configured to execute the instructions and cause the one or more processors to:
receive a request to swap a third clause for a different clause, wherein the third clause is linked to a fourth clause in a series of linked clauses; and
swap the fourth clause to match the different clause or notify that there is an error if there is no stored clause to swap with the fourth clause that matches the different clause.

17. The system of claim 16, wherein the one or more processors are configured to execute the instructions and cause the one or more processors to:
receive a new clause that is indicated to be swap with the fourth clause to match the different clause; and
store the new clause in a clause database as a linked clause to the different clause.

18. The system of claim 16, wherein the one or more processors are configured to execute the instructions and cause the one or more processors to:
receive the request to swap via the interactive chatbot virtual; and
cause the interactive chatbot to ask whether a user wants to swap other linked clauses.

19. The system of claim 15, wherein the one or more processors are configured to execute the instructions and cause the one or more processors to:
receive a third input that initiates a communication module;
receive communication from a first user account of the at least two user accounts;
send the communication to at least another user account of the at least two user accounts; and
store the communication in associated with the digital contract in the tracking database.

20. The system of claim 15, wherein the one or more processors are configured to execute the instructions and cause the one or more processors to toggle back to a previous edit within a clause without changing the rest of the clause in response to receiving a selection of a historical change.

* * * * *